United States Patent
Ledet et al.

(10) Patent No.: US 7,899,618 B2
(45) Date of Patent: Mar. 1, 2011

(54) OPTICAL LASER GUIDANCE SYSTEM AND METHOD

(75) Inventors: Roger J. Ledet, Winnipeg (CA); John E. Yestrau, St. Anne (CA)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 12/421,032

(22) Filed: Apr. 9, 2009

(65) Prior Publication Data

US 2009/0198401 A1    Aug. 6, 2009

Related U.S. Application Data

(62) Division of application No. 10/986,292, filed on Nov. 12, 2004, now Pat. No. 7,536,242.

(51) Int. Cl.
G01C 21/30    (2006.01)
G01C 21/32    (2006.01)

(52) U.S. Cl. .................. 701/211; 701/23; 156/64; 156/355; 356/4.01; 356/3.11; 250/559.29

(58) Field of Classification Search .......... 701/23, 701/26, 211, 28; 156/353, 64, 355; 340/995.28; 348/116, 118; 356/4.01, 3.11; 250/559.29; 901/47

See application file for complete search history.

(56) References Cited

U.S. PATENT DOCUMENTS

| 4,119,900 A | * | 10/1978 | Kremnitz ............... 701/23 |
| 4,133,711 A | * | 1/1979 | August et al. .......... 156/353 |
| 4,345,578 A | * | 8/1982 | Speer ................... 124/56 |
| 4,578,558 A | * | 3/1986 | Clegg .................. 219/121.67 |
| 4,688,937 A | * | 8/1987 | Konig et al. ............ 356/153 |
| 4,786,178 A | * | 11/1988 | Teach ................... 356/400 |
| 4,796,198 A | * | 1/1989 | Boultinghouse et al. ... 701/23 |
| 4,807,131 A | | 2/1989 | Clegg |
| 4,867,834 A | | 9/1989 | Alenskis et al. |
| 5,381,258 A | * | 1/1995 | Bordignon et al. ....... 359/202.1 |

(Continued)

FOREIGN PATENT DOCUMENTS

DE    3536974    4/1987

(Continued)

OTHER PUBLICATIONS

An instrument for measuring high power laser beam profiles and beam attenuation; Fetherolf, B. L. et al.; Review of Scientific Instruments; vol. 61, Issue: 1; Digital Object Identifier: 10.1063/1.1141904; Publication Year: 1990, pp. 7-10.*

(Continued)

*Primary Examiner*—Cuong H Nguyen

(57) ABSTRACT

A method of guiding a vehicle comprises sensing a position of a laser beam using a laser sensor and receiving a signal from the laser sensor wherein the signal is representative of the position of the laser beam. The method further includes interpreting the signal, generating a control signal in response to the laser beam being greater than a predetermined distance from a predetermined reference position and wherein the control signal is configured to control the vehicle to track the position of the laser beam. The method additionally comprises sending the control signal to a drive actuator.

18 Claims, 4 Drawing Sheets

U.S. PATENT DOCUMENTS

| | | | |
|---|---|---|---|
| 5,651,600 | A | 7/1997 | Dorsey-Palmateer |
| 5,786,994 | A | 7/1998 | Friz et al. |
| 6,066,830 | A * | 5/2000 | Cline et al. ............ 219/121.69 |
| 6,226,389 | B1 * | 5/2001 | Lemelson et al. ........... 382/104 |
| 6,324,455 | B1 * | 11/2001 | Jackson ....................... 701/50 |
| 7,073,268 | B1 * | 7/2006 | Etter et al. .................... 33/286 |
| 7,359,762 | B2 * | 4/2008 | Etter et al. .................. 700/180 |
| 7,536,242 | B2 * | 5/2009 | Ledet et al. ................... 701/23 |
| 7,609,972 | B2 * | 10/2009 | Cunningham et al. ....... 398/118 |
| 2006/0101961 | A1 * | 5/2006 | Etter et al. ................... 83/76.8 |
| 2006/0106482 | A1 * | 5/2006 | Etter et al. .................. 700/180 |
| 2006/0111809 | A1 * | 5/2006 | Etter et al. .................. 700/180 |
| 2006/0116787 | A1 * | 6/2006 | Etter et al. .................. 700/180 |
| 2009/0198401 | A1 * | 8/2009 | Ledet et al. ................... 701/26 |
| 2010/0006550 | A1 * | 1/2010 | Haight et al. .......... 219/121.85 |

FOREIGN PATENT DOCUMENTS

| | | | | |
|---|---|---|---|---|
| JP | 61189892 | A | * | 8/1986 |
| JP | 03216286 | A | * | 9/1991 |
| JP | H08-063227 | | | 3/1996 |
| JP | 09150284 | A | * | 6/1997 |
| JP | 2001121278 | A | * | 5/2001 |
| JP | 2002080913 | A | * | 3/2002 |
| JP | 2005314198 | A | * | 11/2005 |
| JP | 2006218535 | A | * | 8/2006 |

OTHER PUBLICATIONS

Cutting Force-Based Feedback Control Scheme for Surface Finish Improvement in Diamond Turning; Jeong, Sanghwa et al.; American Control Conference, 1993; Publication Year: 1993 , pp. 1981-1985.*

Tomizuka, M. and S. Zhang, "Modelling and Conventional/Adaptive PI Control of a Lathe Cutting Process", Trans. of the ASME, vol. 110, pp. 350-354, 1988.*

Yang, S. and M. Tomizuka, "Adaptive Puls Width Control for Precise Positioning Under the Ifluence of Stiction and Coulomb Friction", Jour. of Dynamic Systems, Measurement, and Control, vol. 110, pp. 221-227, 1988.*

CAD/CAM software framework design for the laser micromachining device driven by two stages; Fanhui Meng; Hongzhi Wang; Electronic Packaging Technology & High Density Packaging (ICEPT-HDP), 2010 11th International Conference on; Digital Object Identifier: 10.1109/ICEPT.2010.5582662; Publication Year: 2010 , pp. 902-905.*

Microbeam high-resolution x-ray diffraction in strained InGaAlAs-based multiple quantum well laser structures grown selectively on masked InP substrates; Sirenko, A. A. et al.; Journal of Applied Physics; vol. 97 , Issue: 6; Digital Object Identifier: 10.1063/1.1862769; Publication Year: 2005 , pp. 063512-063512-7.*

Laser crack-free cutting technique for thick and dense ceramics; Lingfei Ji et al.; Lasers & Electro Optics & The Pacific Rim Conference on Lasers and Electro-Optics, 2009. CLEO/PACIFIC RIM '09. Conference on; Digital Object Identifier: 10.1109/CLEOPR.2009.5292746; Publication Year: 2009 , pp. 1-2.*

Incorporating Lamination Processing and Component Manufacturing in Electrical Machine Design Tools; Arshad, W.M. et al.; Industry Applications Conference, 2007. 42nd IAS Annual Meeting. Conference Record of the 2007 IEEE; Digital Object Identifier: 10.1109/07IAS.2007, Publication Year: 2007 , pp. 94-102.*

Laser applications in the manufacturing process; Brooke, S.J.; High Energy Beam Processes for Industrial Applications, IEE Colloquium on; Publication Year: 1988 , pp. 9/1-9/2.*

Commercial CAD tools based digital integrated development platform for laser cutting robot; Ting Yao et al.; Robotics and Biomimetics (ROBIO), 2009 IEEE International Conference on; Digital Object Identifier: 10.1109/ROBIO.2009.5420510 Publication Year: 2009 , pp. 2114-2118.*

Advanced laser processing of metals; Mazumder, J.; Advanced Applications of Lasers in Materials Processing/Broadband Optical Networks/Smart Pixels/Optical MEMs and Their Applications. IEEE/LEOS 1996 Summer Topical Meetings: Digital Object Identifier: 10.1109/LEOSST.1996.540662; Publication Year: 1996 , pp. 23-25.*

A uniform laser energy control for ceramic sintering rapid prototyping; Tseng, S.P.; Hwa-Hsing Tang; SICE Annual Conference 2010, Proceedings of; Publication Year: 2010 , pp. 3116-3120.*

* cited by examiner

OPTICAL LASER GUIDANCE SYSTEM AND METHOD

CROSS-REFERENCE TO RELATED APPLICATIONS

This application is a divisional of and claims priority to U.S. application Ser. No. 10/986,292 filed on Nov. 12, 2004 and entitled OPTICAL LASER GUIDANCE APPARATUS SYSTEM AND METHOD, the entire contents of which is expressly incorporated herein by reference.

FIELD

The present disclosure relates generally to vehicle guidance systems. More particularly, the present disclosure relates to optical laser-based navigation and control systems for robotic manufacturing devices.

BACKGROUND

Although scientists anticipated years ago that automated machines, or robots, could be designed to perform myriad tasks in the place of humans, and the general expectation that robots one day should perform the majority of mundane physical tasks has become ubiquitous, the realization of this vision has been slow to develop. Even with the prominence of the modern microprocessor, many difficulties have yet to be overcome before robotic machines will be capable of performing common tasks easily performed by humans. Nevertheless, significant advancements have been made in this area of technology, particularly with regards to application-specific robotic machines developed to perform specialized tasks in mass-production or high-precision manufacturing processes.

While stationary robots with multi-jointed appendages may be programmed to execute specific movements within a limited area, or such robots may be transported about an extended area by a gantry, the development of free-roaming robotic machines capable of navigating their way over a variety of different surfaces has proven more difficult. Mobile robots depend on the advancement of technology in the area of automatic guided vehicles (AGVs). A number of navigation schemes for such vehicles have met with limited success, based on technologies such as gyroscopes, magnetic sensors, wheel encoders, radio transponder sensors, the Global Positioning System (GPS), or laser reflectors.

Unfortunately, each of these systems fails to provide a cost effective solution with the required accuracy and response time. For example, some existing systems present response-time difficulties due to the complexity of the required real-time calculations. These difficulties are compounded when three-dimensional, as opposed to two-dimensional, navigation and control is contemplated. Other systems do not provide sufficient accuracy for applications that require increased precision, such as certain manufacturing processes. Furthermore, existing positioning and navigation systems may be cost prohibitive.

Accordingly, it is desirable to provide a method and apparatus for the navigation and control of a vehicle that provides a high degree of positional accuracy, while limiting the quantity and complexity of real-time calculations necessary to determine and correct the position of the vehicle, in two-dimensions as well as in three-dimensions, all without incurring excessive costs.

SUMMARY

The foregoing needs are met, to a great extent, by the present disclosure, wherein in one aspect an apparatus and method are provided that in some embodiments provide laser-based navigational guidance and control of a vehicle, such as a robot, with a high degree of positional accuracy, while limiting the quantity and complexity of real-time calculations necessary to determine and correct the position of the vehicle, in two-dimensions as well as in three-dimensions, by tracking a laser beam projected from a remote source.

In accordance with one aspect of the present disclosure, an optical laser guidance system includes a laser sensor to sense the position of a laser beam and responsively generate a position signal. The system also includes a vehicle drive actuator. The laser sensor and the vehicle drive actuator are linked to a controller, which receives the position signal and controls the vehicle drive actuator in response to the position signal.

In accordance with another aspect of the present disclosure, a method for enabling a controller to guide a vehicle based on input regarding the position of a sensed laser beam includes receiving a signal from a laser sensor, the signal being representative of the position of a laser beam and interpreting the representative signal. The method also includes generating a control signal to control a vehicle to track the position of the laser beam, and sending the control signal to a vehicle drive actuator.

In accordance with yet another aspect of the present disclosure, a method for creating a vehicle guidepath includes determining a sequence of directions in which sequentially to point a laser beam in order to dynamically create a vehicle guidepath. The method further includes generating a control signal for sequentially pointing a laser source in a sequence of directions to dynamically create the vehicle guidepath and sending the control signal to the laser source. Furthermore, the method includes sequentially pointing the laser beam in the sequence of directions so as dynamically to create the vehicle guidepath.

In still another aspect in accordance with the present disclosure, an optical laser guidance system includes means for determining a sequence of directions in which sequentially to point a laser beam in order to dynamically create a vehicle guidepath. The laser guidance system also includes means for generating a first control signal for sequentially pointing a laser source in a sequence of directions to dynamically create the vehicle guidepath and means for sending the control signal to the laser source. Additionally, the laser guidance system includes means for sequentially pointing a laser beam in a sequence of directions so as dynamically to create the vehicle guidepath, and means for means for receiving a signal from a laser sensor, the signal being representative of the position of a laser beam, as well as means for interpreting the representative signal. Furthermore, the laser guidance system includes means for generating a second control signal to control a vehicle to track the position of the laser beam, and means for sending the second control signal to a vehicle drive actuator.

In accordance with yet another aspect of the present disclosure, a computer program product for enabling a controller to guide a vehicle based on input regarding the position of a detected laser beam. The computer program product comprises software instructions for enabling a controller to perform predetermined operations and a computer readable medium bearing the software instructions. The predetermined operations include receiving a signal from a laser sensor, the signal being representative of the position of a laser beam, interpreting the representative signal, generating a control signal to control a vehicle to track the position of the laser beam, and sending the control signal to a vehicle drive actuator. As a result, the controller is enabled to control the vehicle in order to track the position of the laser beam.

In accordance with yet another aspect of the present disclosure, a computer program product for enabling a computer to cause a laser source to create a vehicle guidepath. The computer program product comprises software instructions for enabling a controller to perform predetermined operations and a computer readable medium bearing the software instructions. The predetermined operations include determining a sequence of directions in which sequentially to point a laser beam in order to dynamically create a vehicle guidepath, generating a control signal for sequentially pointing a laser source in a sequence of directions to dynamically create the vehicle guidepath, and sending the control signal to the laser source. As a result, the computer processor is enabled to control the laser source to dynamically create the vehicle guidepath.

There has thus been outlined, rather broadly, certain embodiments of the disclosure in order that the detailed description thereof herein may be better understood, and in order that the present contribution to the art may be better appreciated. There are, of course, additional embodiments of the disclosure that will be described below and which will form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

Figure 1:
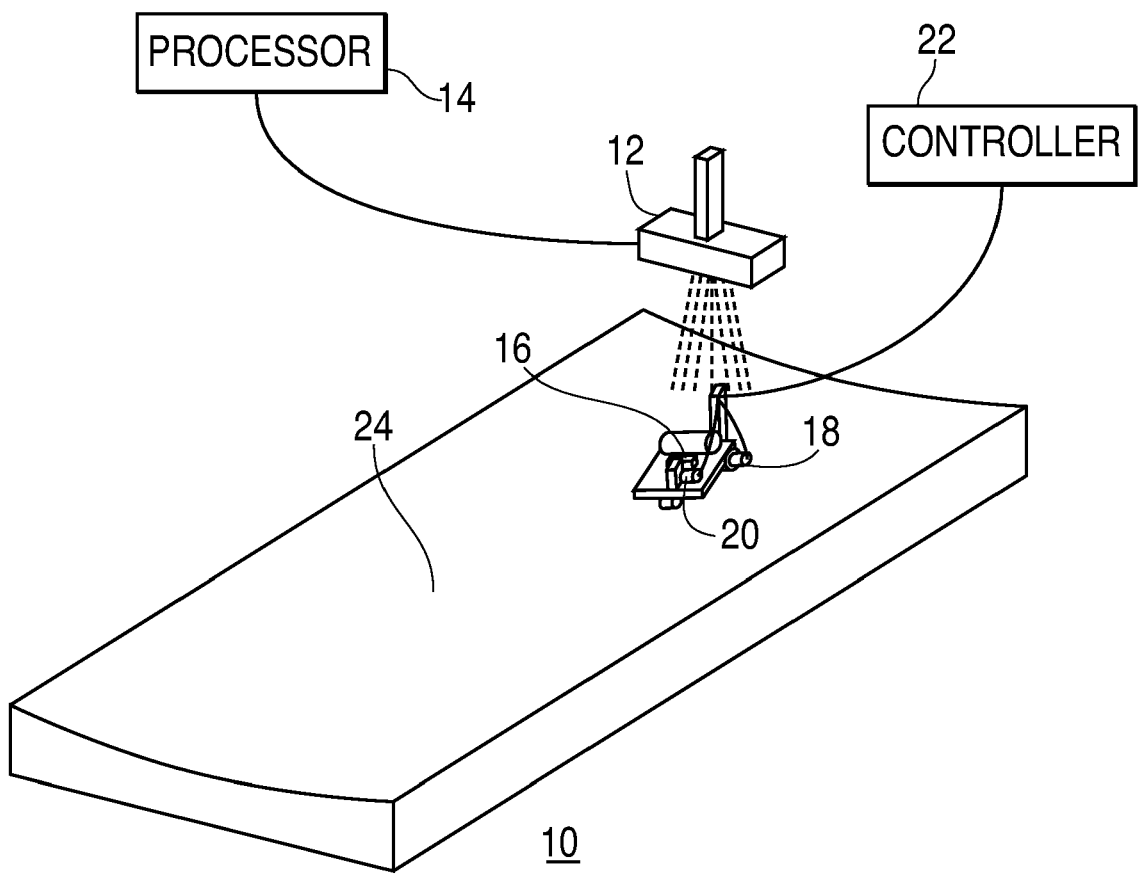
FIG. 1 illustrates an optical laser guidance system according to a preferred embodiment of the disclosure.

The disclosure will now be described with reference to the drawing figures, in which like reference numerals refer to like parts throughout. A preferred embodiment in accordance with the present disclosure, illustrated in FIG. 1, provides an optical laser guidance system 10 that includes a laser source 12 and an associated processor 14, a laser sensor 16 mounted on a vehicle, two drive actuators—a drive wheel actuator 18 and a steering actuator 20—attached to the vehicle, and an associated controller 22.

In this embodiment, a laser beam is projected in a manner so as to delineate a guidepath corresponding to a contoured surface 24, and the laser sensor 16 detects the location of the laser beam, which may be continuous or pulsed. As used herein, a guidepath represents a projected curvilinear path through space that provides navigational guidance for a vehicle. A guidepath may lie on or correspond to a two-dimensional or three dimensional surface, or may be independent of any surface. The processor 14 determines the location of the laser beam with respect to a predetermined reference position, and generates a control signal to command the steering actuator 20 in order to cause the vehicle to track the projected guidepath. This embodiment of the present disclosure thus provides navigational guidance and control of a vehicle by tracking a laser beam projected from a remote source.

Figure 2:
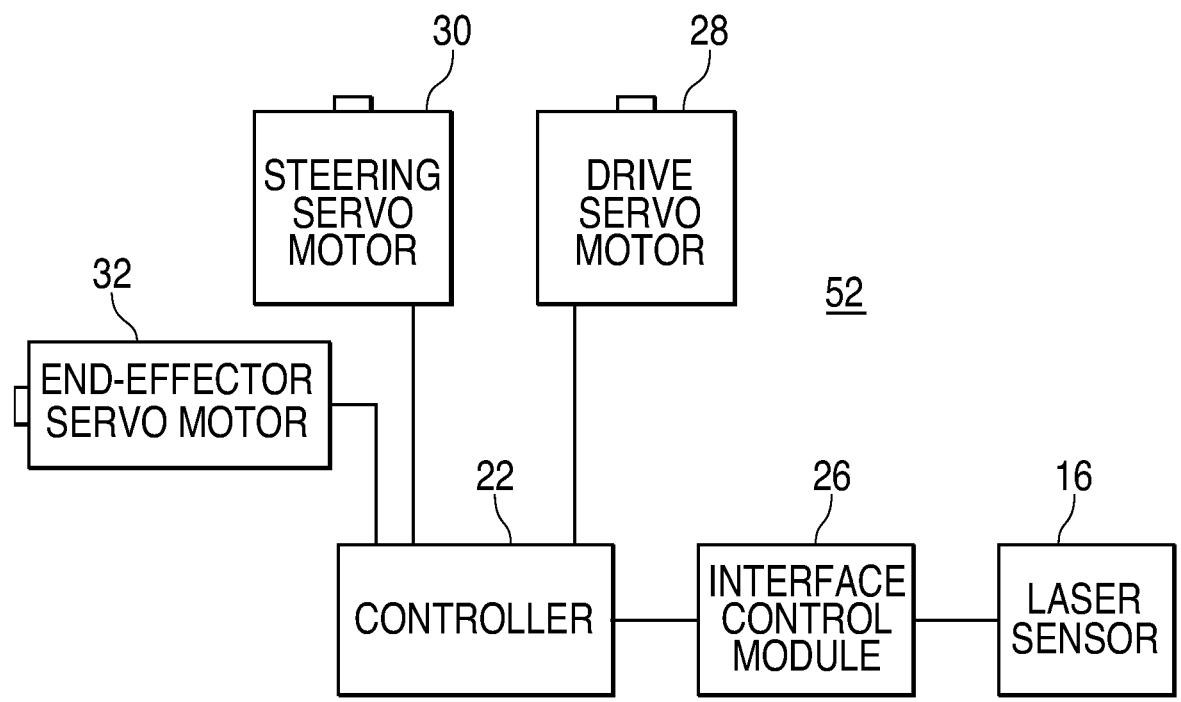
FIG. 2 illustrates an optical laser guidance system according to an alternative preferred embodiment of the disclosure.

Another embodiment of the present apparatus is illustrated in FIG. 2, which illustrates an example of an optical laser guidance system 52. This embodiment includes a laser sensor 16 and an associated interface control module 26. This embodiment also includes two drive actuators: a drive servo motor 28, a steering servo motor 30, each of which is electronically linked to a controller 22. In addition, this embodiment includes an end-effector servo motor 32, or actuator, which is electronically linked to the controller 22. The laser sensor 16 and associated interface control module 26 also are linked to the controller 22.

In this embodiment, the drive servo motor 28 and the steering servo motor 30, respectively, are mechanically coupled to a drive system, including a drive mechanism and a steering mechanism on a vehicle. The drive mechanism includes any suitable device or combination of devices capable of propelling the vehicle, such as a drivable wheel or multiple drivable wheels, a drivable track or multiple drivable tracks, or the like. Likewise, the steering mechanism includes suitable any device or combination of devices capable of changing the vehicle direction of travel, such as a steerable wheel or multiple steerable wheels, or a differential velocity of multiple wheels or tracks, or the like.

The end-effector servo motor 32 is mechanically coupled to a robotic end-effector, for example, a manufacturing tool, such as a tape lamination material dispensing head. An example of such a device is disclosed in U.S. patent application Ser. No. 10/437,067, Vacuum Assisted Ply Placement Shoe and Method, Ledet et al., filed May 14, 2003. The term "end-effector" is used herein to refer to any mechanism or device that may be attached to a vehicle or robot to perform some useful function, such as a manufacturing process or a non-manufacturing task, including welding, cutting, drilling, cleaning, painting, handling, transporting, etc.

In this embodiment, a laser beam projected from an external source to delineate a guidepath is detected by the laser sensor 16, which generates an electrical signal representative of the location of the laser beam. This signal is sent to the interface control module 26, which conditions the signal and sends it to the controller 22. The controller 22 performs an algorithm to determine the location of the laser beam with respect to a predetermined reference position relative to the laser sensor 16.

In response to the laser beam being greater than a predetermined distance from the reference position, the controller 22 uses the distance between the laser beam and the reference position, and the direction (left or right) from the reference position to the laser beam to generate an appropriate electrical steering control signal, which is sent to the steering servo motor 30 and causes the steering servo motor 30 to rotate to a specific angular position, proportionate to the distance between the reference position and the laser beam, resulting in the steerable wheel being oriented at a specific angle in the direction that correctively adjusts the path of the vehicle toward the guidepath. By continually adjusting the steering control signal, the controller 22 causes the vehicle to track the projected laser beam.

The example laser sensor 16 shown in FIG. 2 is a linear laser receiver comprising a photodiode array, of the type commonly used in grader control systems in the construction industry. In these systems, an array of photosensitive cells has been implemented as a proportional laser receiver to recognize the height at which a projected laser beam strikes the array with respect to a predetermined reference height on the array. In these systems, a laser beam is projected at a predetermined height from the desired grade level on a construction site, and laser receivers are attached at that height from the lower edge of the grader blade. During grading operations, the grade level is manually or automatically adjusted in response to the difference between the laser beam height and the reference height in order to maintain the correct grade level.

An embodiment of the present disclosure incorporates the Apache Technologies BULLSEYE® 5MC proportional laser receiver. Nevertheless, it will be appreciated that any photodetector with sufficient accuracy to be suitable for the vehicle application may be substituted for the laser sensor 16. This includes any suitable device with one or more photosensitive or photoactive arrays. For example, an embodiment of the disclosure may implement a charge-coupled device (CCD) camera or a machine vision system as the laser sensor 16.

The laser sensor 16 may be linear or proportional, and provide one-dimensional positional feedback regarding the incidence of the laser beam upon the array (for example, up and down, or right and left), or may provide two-dimensional positional feedback (for example, right and left, as well as fore and aft). In an embodiment, three of the four linear photosensitive arrays in a 360° proportional laser receiver are disabled, and the single remaining photosensitive array on one face of the laser receiver is utilized to detect the incident laser beam. In addition, the photosensitive array is covered by a red-light filter pane, with an abraded texture finish, to control the color spectrum and refractive diffusion of the projected laser beam. The light-filtering pane also enhances the performance of the photosensitive array by minimizing effects caused by ambient sources.

In some preferred embodiments of the present disclosure, the interface control module 26 conditions the positional feedback signal from the laser sensor 16 as appropriate for compatibility between the specific laser sensor 16 employed and the controller 22. In some embodiments of the disclosure, a commercially available control box made for use with the specific laser receiver is employed.

For example, in a particular embodiment of the disclosure the Apache Technologies Model 24 control box is employed with modifications to provide the desired functionality. In this embodiment, the interface control module 26 effectively divides the utilized array of photosensitive diodes into fifteen segments, or bands, across the array. One segment is in the center of the array, or in the center of the laser receiver. In addition, seven bands lie on either side of the center segment. The interface control module 26 provides the user with the capability to vary the effective width of the segments, or bands, thus varying the precision of the positional signal as well as the overall width of the active portion of the photosensitive array. In addition, the interface control module 26 provides the capability to adjust the refresh rate of the output signal, that is, the frequency with which the output signal is updated.

In other embodiments, depending upon the particular laser sensor 16 and controller 22 employed in the embodiment, a different interface control module 26 may be included. In yet other embodiments, where the laser sensor 16 and controller 22 include all the appropriate functionality for complete interface compatibility, the interface control module 26 is optional and thus is omitted without any effect on the overall functionality of the system.

Figure 3:
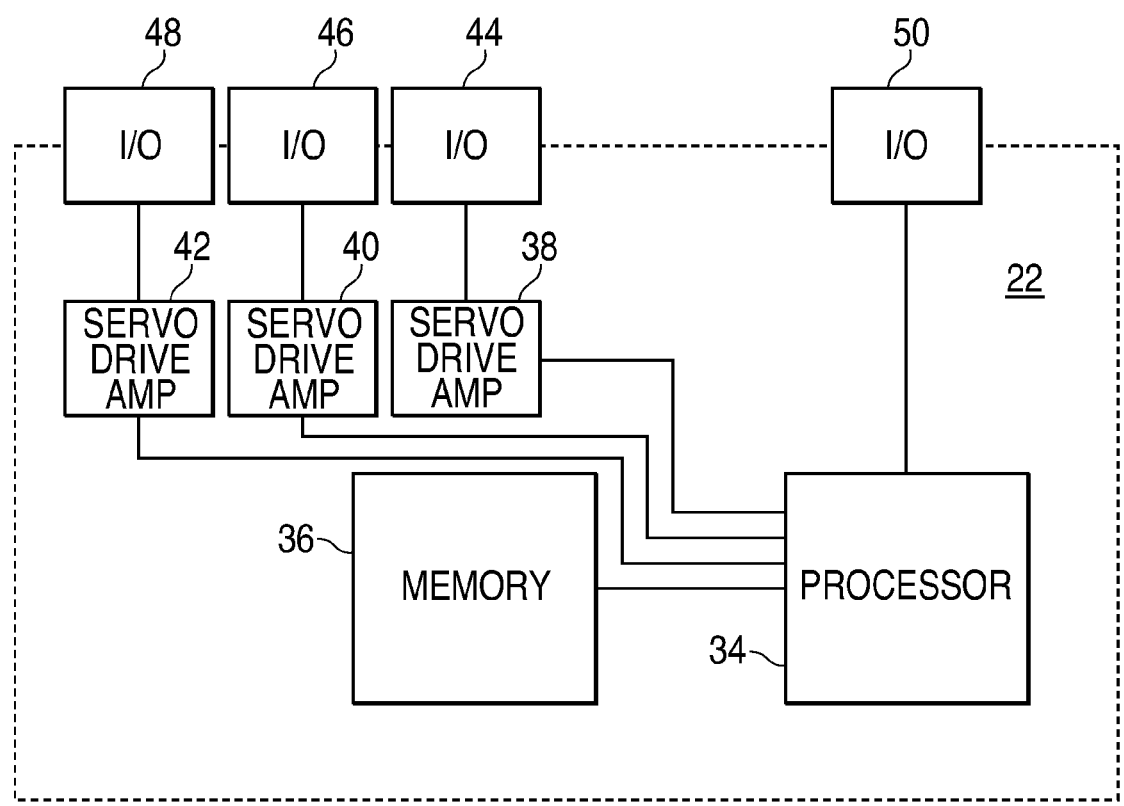
FIG. 3 illustrates a system architecture for a controller compatible with the optical laser guidance system of FIG. 2.
Figure 4:
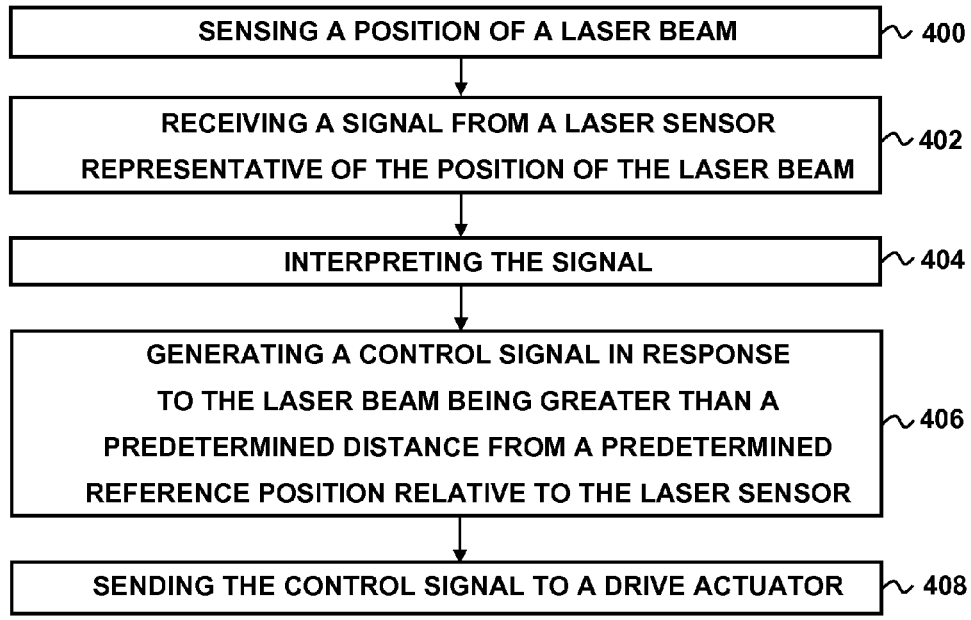
FIG. 4 is a flow chart illustrating an embodiment of a methodology of guiding a vehicle.
Figure 5:
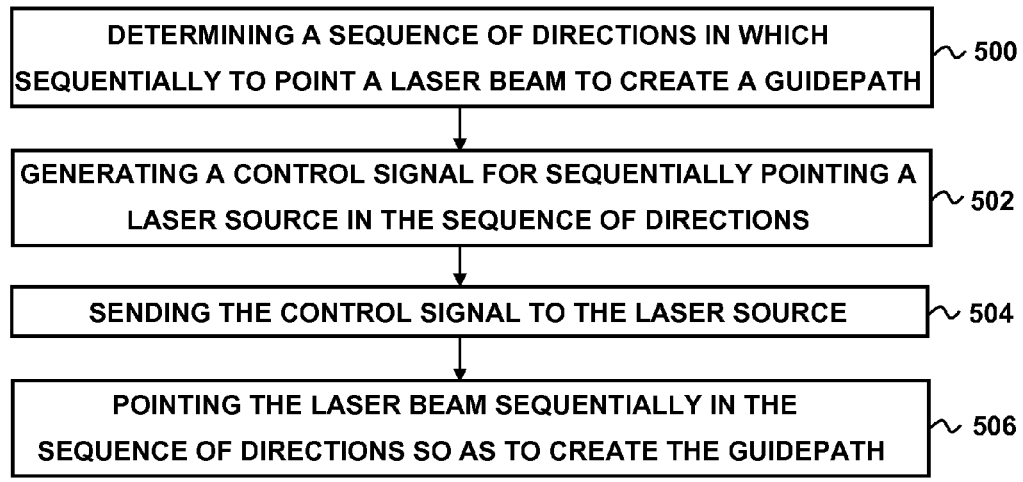
FIG. 5 is a flow chart illustrating an embodiment of a methodology of creating a guidepath for a vehicle.

A schematic diagram of a suitable controller 22 is shown in FIG. 3. This controller 22 includes a processor 34, a memory 36, and three servo drive amplifiers 38, 40, and 42, corresponding to the drive servo motor 28, steering servo motor 30, and end-effector servo motor 32, respectively. The controller 22 also includes four input/output (I/O) ports 44, 46, 48, and 50 corresponding to the three servo drive amplifiers 38, 40, and 42 and to the processor 34, respectively.

The controller 22 may further include a user interface, such as a display or monitor, or keys or buttons, to communicate information to a user and accept user input, for example, by way of an interactive, menu-driven, visual display-based user interface. Various embodiments of the disclosure include any number of suitable functional user interface schemes, with or without the use of an integral visual display device or buttons or keys, including a voice-activated system.

In some embodiments of the present disclosure, a computer program including instructions for processing input signals from the laser sensor 16 and generating control signals for the drive wheel actuator 18, steering actuator 20, and end-effector actuator 32 is downloaded by way of the I/O port 50 into the controller 22 from a personal computer or other device capable of reading object code from a computer-readable medium and transmitting it to the controller 22, and the program is stored in the memory 36. The processor 34 executes the program, which performs an algorithm to determine the direction (left or right) and the distance from the center of the laser receiver array to the laser beam, and to generate a responsive control signal, which is sent to the steering servo drive amplifier 40. The steering servo drive amplifier 40 amplifies the control signal and transmits the resultant steering control signal to the steering servo motor 30 by way of the I/O port 46.

The behavior of the vehicle or robot may be modified by changing certain parameters in the program, such as the amount of time the program is to run, the length of the course to be traveled or the speed at which the vehicle is to operate. In some embodiments, these parameters may be changed by modifying the computer program. In alternative embodiments, the program may request user input at the start of the program to set these parameters. In still other alternative embodiments, the program may give the user the choice to enter certain parameters or to use preprogrammed default parameters.

In still another preferred embodiment of the present disclosure, in addition to the projected laser guidepath the laser sensor 16 may also receive optical control messages. For example, the laser sensor 16 may intermittently receive the guidepath along with an optical control message in the form of a predetermined symbol, bar code or shape, in accordance with the capability of the laser sensor 16 to distinguish symbols, bar codes or shapes, on a portion of the laser sensor 16 remote from the central area where the guidepath generally is received. The controller 22 may be programmed to recognize a variety of such optical control messages and responsively generate control signals for additional functionality of the vehicle or robot.

As a specific example, in the optical laser guidance system 52 shown in FIG. 2, the controller 22 may be programmed to produce steering control signals in response to positional feedback signals representing the center segment of the laser receiver's photosensitive array and five of the seven bands on either side. In this example, the controller 22 may further be programmed to generate additional control signals based on positional feedback received from the two bands at either extreme of the photosensitive array. Thus, at some point during operation the laser beam momentarily is aimed at one of these outer four bands to command the vehicle or robot to perform a predetermined function, such as drive forward, drive in reverse, stop, raise or lower the end-effector, or the like.

As a specific example, in response to positional feedback representative of the extreme (seventh) band to the right of center, the controller 22 could be programmed to generate a control signal to send to the end-effector servo drive amplifier 42 to raise a tape lamination material dispensing head. The servo drive amplifier 42 would amplify the control signal and transmit the resultant end-effector control signal to the end-effector servo motor 32 by way of the I/O port 48 to raise the tape lamination material dispensing head to a predetermined position.

Likewise, the remaining bands, or segments, of the laser receiver array that are not utilized for steering control may be assigned additional individual control messages, in response to which the controller 22 may be programmed to command additional functions in accordance with the capabilities of the drive wheel actuator 18, the steering actuator 20, the end-effector actuator 32, as well as the mechanisms attached to each of these.

In alternative embodiments of the present disclosure, other control message schemes may be programmed into the controller 22 in accordance with the capabilities of the specific laser sensor 16 employed in an embodiment to recognize and distinguish such control messages. Likewise, other alternative embodiments of the disclosure may incorporate multiple laser sensors linked to the controller 22 to receive additional positional signals or control messages.

Although the end-effector actuator 32 in one preferred embodiment is coupled to a tape lamination material dispensing head, it will be appreciated that in alternative embodiments of the disclosure, any other device could be coupled to the end-effector actuator 32 in place of the tape lamination material dispensing head. For example, the end-effector could comprise a drill attachment, or a milling machine attachment, or a paint applicator, or any other manufacturing tool or any device configured to perform a non-manufacturing process. Furthermore, in accordance with the specific end-effector employed in a given embodiment, the controller 22 may be configured to control electromechanical devices other than servo motors and such devices may be incorporated in various embodiments of the present disclosure as required to interface with and control the function of the specific end-effector employed.

Furthermore, while the embodiment illustrated in FIG. 2 shows a single end-effector servo motor 32, alternative embodiments could comprise additional servo motors for additional end-effector mechanisms. Thus, an embodiment of the present disclosure may comprise multiple end-effectors, such as a drill attachment, a milling machine attachment, and a paint applicator, all linked to the controller 22 and attached to the vehicle or robot.

Additionally, still other embodiments in accordance with the present disclosure may include a controller 22 comprising one, two, or more than three servo drive amplifiers configured to drive one, two or more than three servo motors. Moreover, an embodiment of the present disclosure may incorporate multiple controllers, each including multiple servo drive amplifiers. Combining multiple controllers with multiple laser sensors in alternative embodiments of the present disclosure, any number of servo motors may be simultaneously controlled on a single vehicle or robot, or on multiple vehicles or robots.

Although an example of the optical laser guidance system 52 is shown in FIG. 2 using an independent controller 22, it will be appreciated that some or all of the functionality of the controller 22 may be performed by an external, additional or substitute computer processor, including a personal computer linked to the controller 22. In some preferred embodiments of the disclosure, the controller 22 includes a communication port 50 and a corresponding external connector for coupling to a personal computer, which may be used to download software to the controller 22 or may replace or add to the functionality of the controller 22.

In some preferred embodiments, a user may enter manual commands using a personal computer linked to the controller 22. In response to such manual commands, the controller 22 may generate an appropriate control signal to send to one of the servo motors 16, 18, and 20. For example, in a preferred embodiment, a user may enter a manual command to cause the vehicle or robot to start or stop, to drive forward or in reverse, or to cause an end-effector to perform some task, such as to raise or lower the end-effector. In response, the personal computer sends a command signal to the controller 22, which generates a resultant control signal to cause the drive servo motor 16 to rotate in either direction at a specified or predetermined speed, or to cause the end-effector servo motor 32 to rotate.

In another preferred embodiment of the present apparatus and method, the previously described components illustrated in FIG. 2 are combined with a laser source 12, as illustrated in FIG. 1. In this embodiment, the laser source 12 includes a laser projector linked to a processor 14. The processor 14 executes an algorithm that determines a sequence of directions in which to point a laser beam in order to sequentially project a guidepath or an optical control message, and generates a laser projector control signal. For example, in a preferred embodiment of the disclosure, the processor 14 generates the laser projector control signal in response to a data file generated by a guidepath programming algorithm. The laser projector receives this control signal and responsively projects a laser beam at a specific location along the guidepath for a brief moment, then at another location along the guidepath for another brief moment, and so on, at a frequency such that the resulting guidepath appears to be continuous, in a manner analogous to a motion picture made from a sequence of still-frame photographs.

An example of a suitable laser projector for use with the laser guidance system 10 is a Virtek LaserEdge® projection system, which was developed for use in manufacturing processes to project two- and three-dimensional manufacturing templates onto work surfaces. In systems of this type, a computer processor controls a single precision laser beam by way of a combination of mirrors, which is sequentially projected, or scanned, onto a work surface to produce a highly accurate, visible outline of a two-dimensional or three-dimensional design template, replacing traditional physical masks or templates. In order to ensure reproducible accuracy in these systems, laser reflectors are placed on the work piece or manufacturing tooling and the angles of the reflected laser beams are used to determine the precise location of the laser projector with respect to the work surface.

In addition, this type of laser projection system may be programmed to project written instructions onto the surface of the work piece or manufacturing tooling. Precision laser templating and positioning of this sort has been used extensively in aerospace and transportation system manufacturing, particularly in the fabrication of composite components, as well as in the manufacture of prefabricated construction components, such as prefabricated roof segments, door and wall panels, and floor trusses.

A projection system of this type is disclosed in U.S. Pat. No. 5,381,258, the disclosure of which is herein incorporated by reference in its entirety. However, any laser projection system capable of projecting a two-dimensional guidepath, or any laser projection system capable of projecting a three-dimensional guidepath would suffice for the purposes of the laser projector in an embodiment of the present disclosure.

In some embodiments, the guidepath may be two-dimensional, that is, the guidepath may correspond to a planar surface; or it may be three-dimensional, for example, corresponding to a contoured surface, such as that of a manufacturing work piece or tooling. In addition, the guidepath may lie on the actual physical surface upon which the vehicle or robot travels, or it may lie a distance above the surface corresponding to the height and orientation of the laser sensor 16 when mounted on the vehicle.

It is an advantage of certain preferred embodiments of the present disclosure that a guidepath programming algorithm accounts for lateral as well as vertical offset in the location of the laser sensor 16 with respect to the surface path of the vehicle and incorporates the offset information into a guidepath data file, which is converted into a format compatible with the processor 14. For example, in an embodiment wherein the laser beam is directly received or intercepted by the laser sensor 16, the guidepath programming algorithm accounts for the orientation of the vehicle and the resulting position of the laser sensor 16 at any given point along the guidepath or the vehicle path. This functionality is particularly useful in an embodiment wherein the configuration of the base of the vehicle and the local contour of the traveled surface at times result in a laser sensor 16 orientation that does not correspond to a line normal to a point on the traveled surface corresponding to the guidepath or the vehicle path.

Since the guidepath is not a continuous projection, but rather a high-frequency sequential projection of individual points or dots, the laser projector may be programmed to simultaneously project graphical codes, or optical control messages in addition to the guidepath. In this case, the processor 14 commands the laser projector to intermittently project the laser beam at a remote portion of the laser sensor 16, so as to be distinguished from the guidepath itself, forming graphic symbols or shapes that the controller 22 is programmed to recognize and interpret.

Although an example of the laser source 12 is shown in FIG. 1 using an individual laser projector, it will be appreciated that multiple laser projectors may be used to cover a larger area. Thus, in alternative embodiments any number of individual laser projectors may be connected in series or in parallel to effectively project a guidepath over an area of virtually any size.

In yet another embodiment of the present disclosure, a rotating laser may be used to project a two-dimensional guidepath. This simplified laser source 12 does not require computer processing, and thus may operate independent of a processor.

Although the example processor 14 shown in FIG. 1 represents a common personal computer (PC), it will be appreciated that in other embodiments the processor 14 may include any suitable data processing system, such as a server, a collection of networked servers or personal computers, a mainframe computer, etc. Furthermore, in some embodiments the functionality of both the processor 14 and the controller 22 could be combined in a single computer linked to each the laser sensor 16, the actuators 18, 20, and 32 and the laser source 12.

Likewise, it will be appreciated that the processing functions performed by the processor 14 could equally be performed in alternative embodiments by a computer system with peripheral devices, such as an associated keyboard, mouse, and monitor, or by a computer system with no associated peripheral devices. Moreover, the processing functions performed by the processor 14 could in some embodiments be performed by an embedded system included in the laser projector.

In addition, although the various examples of communication links in FIG. 1, FIG. 2 and FIG. 3 are shown using direct cable connections, it will be appreciated that other embodiments may incorporate any combination of devices, as well as any associated software or firmware, configured to couple processor-based systems, including modems, network interface cards, serial buses, parallel buses, LAN or WAN interfaces, wireless or optical interfaces and the like, along with any associated transmission protocols, as may be desired or required by the design.

Moreover, any of the communication links shown in FIG. 1, FIG. 2 or FIG. 3 could in alternative embodiments be replaced or complemented by a communication network comprising any viable combination of devices and systems capable of linking computer-based systems, including a private network; a public network; a local area network (LAN); a wide area network (WAN); an Ethernet-based system; a token ring; the Internet; an intranet or extranet; a value-added network; a telephony-based system, including T1 or E1 devices; an Asynchronous Transfer Mode (ATM) network; a wired system; a wireless system; an optical system; a combination of any number of distributed processing networks or systems; etc.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method of guiding a vehicle, comprising the steps of:
   determining a sequence of directions in which to sequentially point a laser beam to delineate a curvilinear guidepath;
   sequentially projecting the laser beam in the sequence of directions to delineate the curvilinear guidepath;
   sensing a position where the laser beam strikes a laser sensor;

receiving a signal from the laser sensor, the signal being representative of the position where the laser beam strikes the laser sensor;

interpreting the signal;

generating a control signal in response to the position where the laser beam strikes the laser sensor being greater than a predetermined distance from a predetermined reference position relative to the laser sensor, the control signal being configured to control the vehicle to track the position of the laser beam; and sending the control signal to a drive actuator.

2. The method of claim 1 wherein the step of generating the control signal in response to the position where the laser beam strikes the laser sensor being greater than a predetermined distance from a predetermined reference position comprises using the distance between the position where the laser beam strikes the laser sensor and the reference position to generate the control signal.

3. The method of claim 1 wherein the step of generating the control signal in response to the position where the laser beam strikes the laser sensor being greater than a predetermined distance from a predetermined reference position comprises using the direction from the reference position to the position where the laser beam strikes the laser sensor to generate the control signal.

4. The method of claim 1 wherein the drive actuator is coupled to a drive mechanism, the method further comprising the step of:

causing the drive mechanism to propel the vehicle.

5. The method of claim 1 wherein the drive actuator is coupled to a steering mechanism, the method further comprising the step of:

rotating the steering mechanism to a specific angle in a direction that adjusts a path of the vehicle toward the guidepath.

6. The method of claim 1 further comprising the step of:

adjusting the control signal continually to cause the vehicle to track the laser beam.

7. The method of claim 1 wherein the vehicle includes an end-effector, the method further comprising performing at least one of the following steps by the end effector:

a manufacturing process; and a non-manufacturing task.

8. The method of claim 7 wherein the end-effector is configured as a tape lamination material dispensing head, the method further comprising the step of:

raising the tape lamination material dispensing head.

9. The method of claim 1 further comprising the step of:

receiving an optical control message at the laser sensor;

recognizing the optical control message; and generating a control signal.

10. The method of claim 9 further comprising the step of:

commanding the vehicle to perform a predetermined function in response to the control signal, the predetermined function including at least one of the following: drive forward, drive in reverse, stop, raise or lower an end-effector.

11. The method of claim 10 wherein the end-effector is configured as a tape lamination material dispensing head, the method further comprising the step of:

raising the tape lamination material dispensing head to a predetermined position.

12. The method of claim 1 wherein the guidepath corresponds to a three-dimensional surface.

13. A method for creating a curvilinear guidepath for a vehicle having an end-effector, comprising the steps of:

determining a sequence of directions in which sequentially to point a laser beam to delineate the curvilinear guidepath;

generating a control signal for sequentially pointing a laser source in the sequence of directions, the laser source being remote from the vehicle;

sending the control signal to the laser source;

projecting the laser beam sequentially in the sequence of directions so as to delineate the curvilinear guidepath;

sensing a position of the laser beam at a laser sensor mounted on the vehicle;

receiving a signal from the laser sensor, the signal being representative of the position of the laser beam relative to the laser sensor; and generating a control signal in response to the laser beam being located greater than a predetermined distance from a predetermined reference position relative to the laser sensor, the control signal being configured to control the vehicle to track the position of the laser beam.

14. The method of claim 13 further comprising the step of:
adjusting the control signal continually to cause the vehicle to track the laser beam.

15. The method of claim 13 further comprising the step of:
projecting the laser beam intermittently at a remote portion of the laser sensor so as to distinguish a control message from the guidepath.

16. The method of claim 15 further comprising the step of:
commanding the vehicle to perform a predetermined function in response to the control message, the predetermined function including at least one of the following: drive forward, drive in reverse, stop, raise or lower the end-effector.

17. The method of claim 16 further comprising at least one of the following steps performed by the end effector:
welding, cutting, drilling, cleaning, handling, transporting.

18. The method of claim 15 wherein the end-effector is configured as a tape lamination material dispensing head, the method further comprising the step of:
raising the tape lamination material dispensing head to a predetermined position.

* * * * *